July 7, 1970        T. B. BURNS        3,519,771
SAFETY ATTACHMENT FOR SEATBELTS
Filed Oct. 11, 1968        2 Sheets-Sheet 1
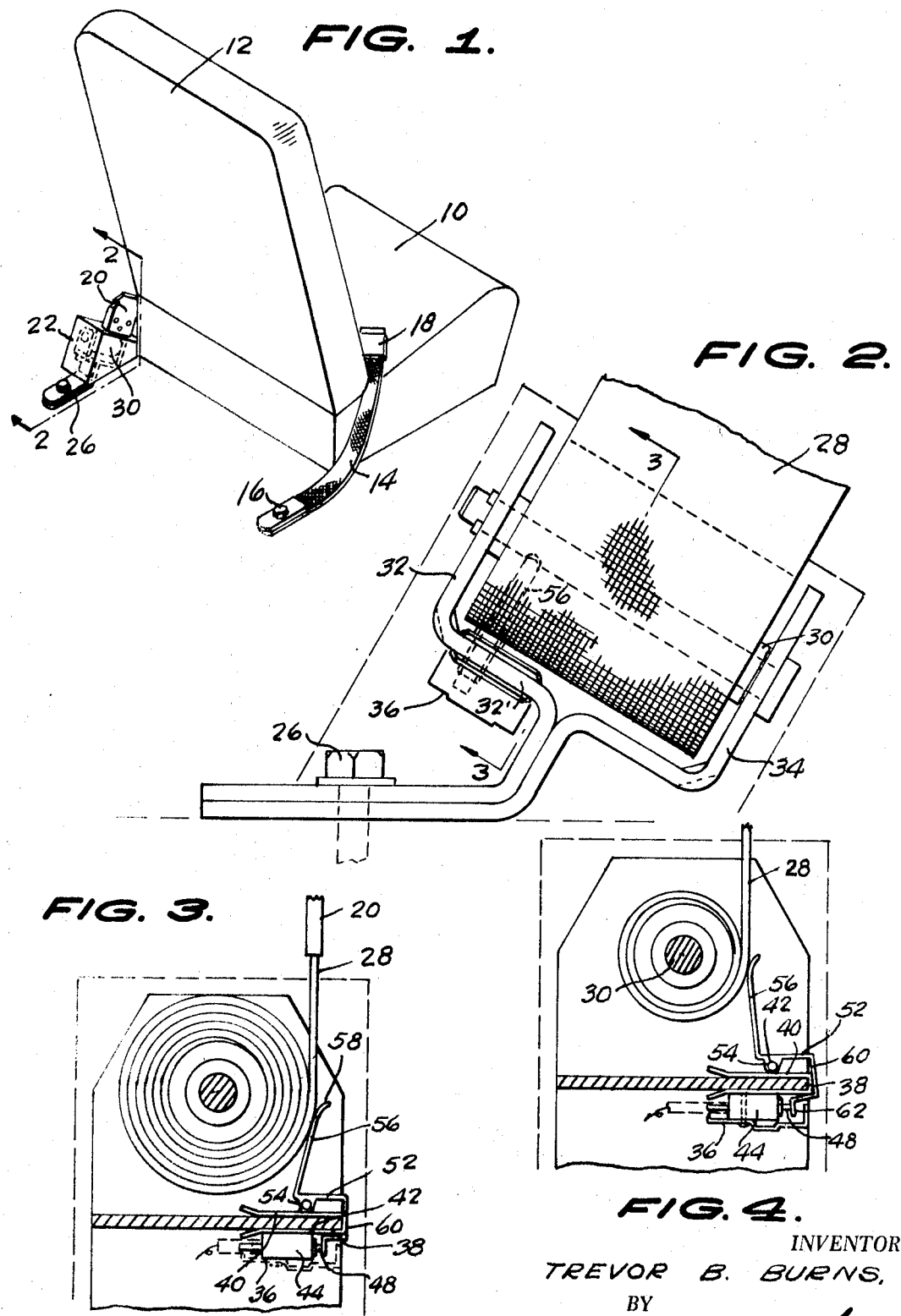
INVENTOR.
TREVOR B. BURNS,
BY
Berman, Davidson & Berman
ATTORNEYS.

July 7, 1970 T. B. BURNS 3,519,771
SAFETY ATTACHMENT FOR SEATBELTS
Filed Oct. 11, 1968 2 Sheets-Sheet 2
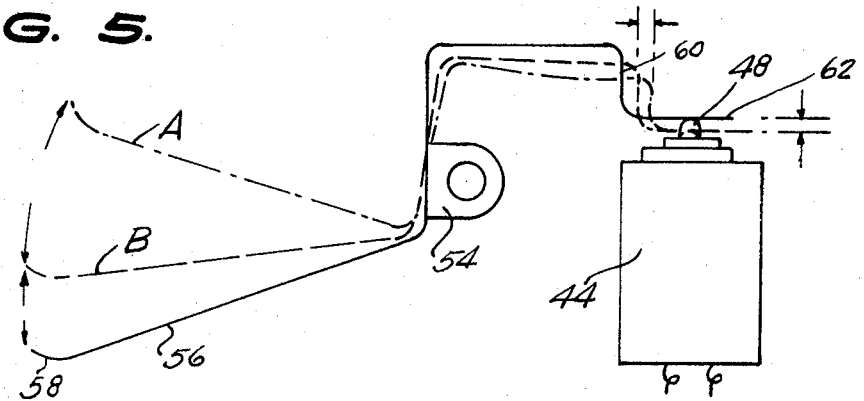
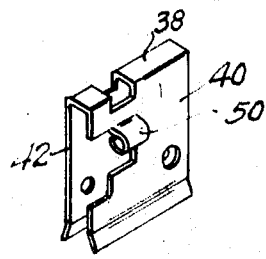
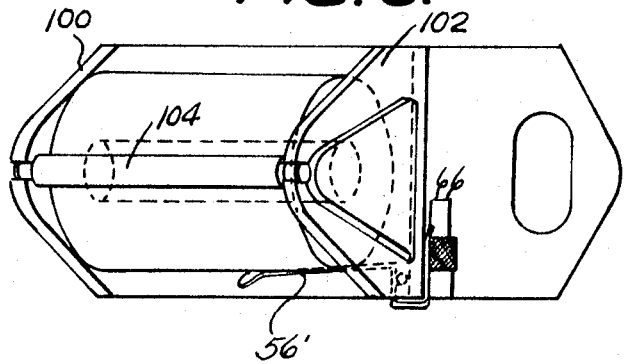
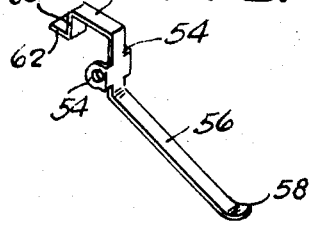
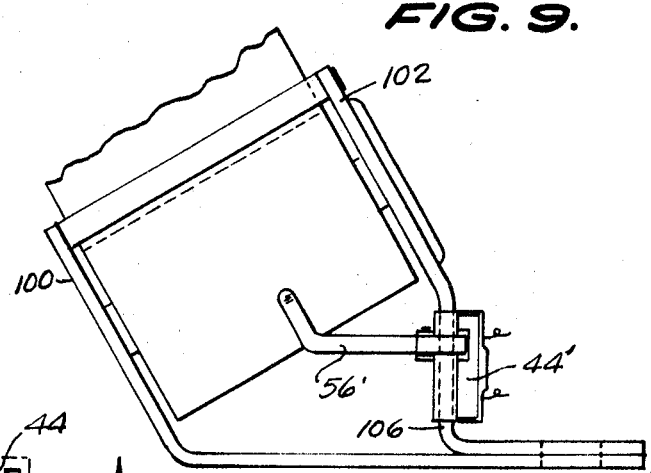
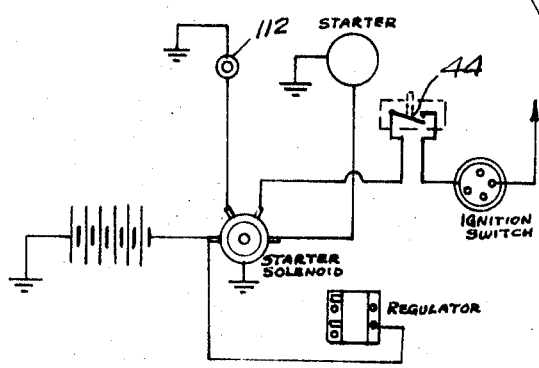
INVENTOR.
TREVOR B. BURNS,
BY
Berman, Davidson & Berman
ATTORNEYS.

3,519,771
SAFETY ATTACHMENT FOR SEATBELTS
Trevor B. Burns, Phoenix, Ariz., assignor to Safety Control, Inc., Tucson, Ariz., a corporation of Arizona
Filed Oct. 11, 1968, Ser. No. 766,848
Int. Cl. H01h 3/16
U.S. Cl. 200—61.58   6 Claims

ABSTRACT OF THE DISCLOSURE

An attachment for use with conventional seatbelts of the automatically retractable type, said attachment comprising: a switch; a lever attachable to the reel of such seatbelt, said lever having an arm resting on said belt and another arm resting on said switch, whereby unreeling said belt operates said switch.

---

It is a well known fact that even though seatbelts are installed in a car, in many, if not most, cases the driver and other occupants neglect to fasten the belt. Many devices have been proposed to overcome this difficulty, designed to disable the starter or the ignition system or the neutral gear lock in order to prevent starting the vehicle until the seatbelt is fastened. There are also various proposals for putting such safety means in series through all of the seatbelts in a car so that the vehicle cannot start or at any rate go into motion until every occupant has fastened his belt. Almost without exception, however, such devices utilize the belts themselves to carry the necessary conductors and either open or close the circuit to produce the desired result upon buckling of the belt.

It is a primary object of this invention to provide a switch operable on tightening a seatbelt which device will operate without utilizing the belt as a conductor or the buckle as a switch operating means. This makes it possible to use the attachment, even though the vehicle is equipped with conventional non-conductive belts.

It is a further object of this invention to provide an attachment as aforesaid which will occupy a minimum of space and be installed with a minimum of difficulty and which will be positive and certain in operation.

The above and other objects will be made clear from the following detailed description when taken in connection with the annexed drawings, in which:

FIG. 1 is a perspective view of the vehicle seat equipped with safety belts and with the attachment of this invention in place;

FIG. 2 is an elevation on the line 2—2 of FIG. 1;

FIG. 3 is a section on the line 3—3 of FIG. 2;

FIG. 4 is an enlarged view similar to FIG. 3, showing the condition of the parts when the belt has been pulled out ready for use;

FIG. 5 is an enlarged schematic illustration of the active components of the attachment;

FIG. 6 is a perspective view showing the holder and bearing for the switch arm;

FIG. 7 is a perspective view of the switch arm per se;

FIG. 8 is a perspective view illustrating a different form of arm in installed location for the device;

FIG. 9 is a bottom plan view of FIG. 8; and

FIG. 10 is a preferred typical wiring diagram.

Referring now to FIG. 1, there is shown a vehicle seat having a seat portion 10 and a back 12. At the right hand side of the seat is a conventional seatbelt 14 having one end conventionally bolted to the floor at 16 and having a conventional buckle 18 at its free end.

At the left hand side is a seatbelt having a conventional latch plate 20 contained in the housing 22 in which a conventional retraction reel 30 has the left hand seatbelt wound around it. The housing 22 is bolted to the floor at 26.

As best seen in FIG. 2, the left hand seatbelt 28 is wound on the reel 30, one end of which bears in a bracket 32 and the other end bears in a bracket 34. The brackets 32 and 34 are bent so that their opposite ends come together at bolt 26. A housing 36 is secured to a portion 32' of the bracket 32. The housing 36 contains the active parts of this attachment, and these will be best understood with reference to FIGS. 3, 4, 6 and 7.

Inside the housing 22 is mounted a clip or bracket 38 having one leg 40 engaging the inner surface of the portion 32' of the bracket 32 and another opposing leg 42 confronting the leg 40, but engaged on the outer surface of the portion 32'. The clip or bracket 38 is shown in detail in FIG. 6. A microswitch 44 is clamped between the arm 42 and the housing 36 by screws which penetrate not only into the housing 36 but both of the legs 40 and 42. An operating button 48 protrudes from the microswitch casing 44.

As best seen in FIG. 6, a sleeve 50 is formed in the leg 40 and forms a pivot for an operating arm 52 which is shown in detail in FIG. 7. The arm 52 has a pair of ears 54 apertured to receive a pivot pin which also passes through the bearing 50 formed in the wall 40. On one side of the ears 54 the arm 52 has an elongated portion 56 which terminates in an upwardly curved end 58 and which bears on the belt 28.

On the other side of the ears 54 the arm 52 has a U-shaped formation 60 with one leg 60' terminating in a protruding foot 62. The foot 62 bears on the operating button 48 of the microswitch 44.

The button 48 is spring-biased and assists in keeping the arm 56 in contact with the belt 28.

As seen in FIG. 3, the belt 28 is fully retracted, the arm 52 thereby being turned clockwise enough to depress the button 48 and thereby to hold the microswitch in open condition. In FIG. 4, the belt 28 has been pulled off the reel sufficiently to enable engagement of the latch plate 20 with the buckle 18 and the arm 52 has rotated counterclockwise sufficiently to lift the tongue 62 and permit the button 48 to move sufficiently to close the microswitch.

The action just described is best illustrated in FIG. 5, where dotted line position A represents arm 56 in the position shown in FIG. 3. It is to be noted that the microswitch cannot open until the arm 56 has moved from the dotted line position A to dotted line position B. The full line position in FIG. 5 corresponds to the condition in FIG. 4. The "lost motion" represented by dotted line positions A and B, FIG. 5, is important since it assures that a considerable length of belt 28 must be unreeled before the microswitch is effective, and thus minor, inadvertent withdrawals of the belt 28 will not activate the switch. This lost motion is calculated so as the belt must be 70% unwound before the switch can operate.

FIGS. 8 and 9 show the unit attached to a different form of bracket which requires a somewhat different construction or design of the belt contacting arm. Here, the belt reel is suported in brackets 100 and 102 which also support an antifrictiton roller 104 which assists a both withdrawal and retraction of the belt 28. An arm and switch assembly 44' is attached to a portion 106 of the arm 102. The belt sensing arm 56' of the switch 44' is bent intermediate its length to accommodate the oblique angle at which the portion 106 bears relative to the free end of the arm 102, otherwise the operation is the same.

It will be understood that no matter what form is given to the arm 52 or 56', the entire structure is small but highly resilient and is formed so that the resilience (particularly the portion 60 at its corners) suffices to hold the switch open until the belt 28 is 70%, at least, withdrawn.

Referring now to FIG. 10, there is shown a typical wiring diagram in which a battery is connected to a starter solenoid and also to an ignition switch. The microswitch 44 in this figure is in series with the ignition switch but it equally well could be placed in series with the starter or, if the car has an automatic transmission, with a neutral lock (in FIG. 10) designated as 112, the switch 44 could be inserted in that circuit. If, in addition to switch 44, on the belt at the driver's seat, other switches are placed in series therewith to the safety belts of other car occupants, a self-locking circuit of conventional design is provided so that if one of the other belts is inadvertently loosened while the car is in motion, the ignition switch will not be affected and the car will continue to run.

No doubt a perusal of this specification by one skilled in the art will suggest possible variations in structure without departure from the spirit of this invention.

What is claimed is:

1. A device for attachment to a conventional seat-belt assembly having a belt on an automatically retractable reel, said reel being rotatably mounted in anchoring means, said device comprising: an electric switch; a lever operable by the belt, said lever having a portion resting on said belt and another portion resting on said switch, a spring impelling said arm toward said belt, said portions of said lever being so proportioned that a large movement of said belt-contacting portion produces a small movement of said switch-contacting portion whereby unreeling a predetermined portion of said belt amounting to substantially less than the full length of said belt, said belt operating said switch.

2. The device of claim 1, including a U-shaped bracket straddling a wall of the reel mounting, said switch being secured to one leg of said bracket and said lever being pivoted to the opposite leg.

3. The device of claim 1, in which said lever has its reel sensing arm elongated and its switch contacting arm U-shaped.

4. The device of claim 1, in which said lever is sufficiently resilient to permit said belt to be over 50% unwound before actuation of said switch.

5. The device of claim 2, in which said lever has its reel sensing arm elongated and its switch contacting arm U-shaped.

6. The device of claim 2, in which said lever is sufficiently resilient to permit said belt to be over 50% unwound before actuation of said switch.

References Cited

UNITED STATES PATENTS

| | | | |
|---|---|---|---|
| 1,300,257 | 4/1919 | Felland | 200—61.16 |
| 3,381,268 | 4/1968 | Boblitz. | |

HERMAN O. JONES, Primary Examiner

M. GINSBURG, Assistant Examiner